(12) United States Patent
Bramson

(10) Patent No.: US 10,344,690 B2
(45) Date of Patent: Jul. 9, 2019

(54) EXHAUST SYSTEM AND METHODS FOR EFFICIENT EXHAUST HEAT RECOVERY

(71) Applicant: Ford Global Technologies, LLC, Dearborn, MI (US)

(72) Inventor: Eric David Bramson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/497,099

(22) Filed: Apr. 25, 2017

(65) Prior Publication Data

US 2017/0226943 A1  Aug. 10, 2017

Related U.S. Application Data

(63) Continuation of application No. 14/521,413, filed on Oct. 22, 2014, now Pat. No. 9,631,540.

(51) Int. Cl.
*F02D 41/06* (2006.01)
*F01N 3/02* (2006.01)
(Continued)

(52) U.S. Cl.
CPC ........... *F02D 41/0052* (2013.01); *F01N 3/02* (2013.01); *F01N 5/02* (2013.01); *F02D 41/068* (2013.01);
(Continued)

(58) Field of Classification Search
CPC ........... F02M 25/0726; F02M 25/0771; F02M 25/0782; F02M 25/0715; F02M 25/0717; F02M 25/07; F02M 2026/001; F02M 26/28; F02M 26/47; F02M 26/05; F02M 26/15; F02M 26/14; F02M 26/16; F02M 26/22; F02M 26/61; F02M 26/33; F01N 5/02; F01N 3/02; F02D 2021/083; F02D 41/0055; F02D 41/064; F02D 41/068; F02D 9/04; F02D 9/06
See application file for complete search history.

(56) References Cited

U.S. PATENT DOCUMENTS

| | | | | |
|---|---|---|---|---|
| 6,155,042 A | * | 12/2000 | Perset | F01N 3/043 60/278 |
| 6,543,427 B2 | * | 4/2003 | Kawasaki | F02M 26/16 123/568.12 |

(Continued)

*Primary Examiner* — George C Jin
(74) *Attorney, Agent, or Firm* — Julia Voutyras; McCoy Russell LLP

(57) ABSTRACT

Systems and methods are described for heating engine coolant by transferring heat from an exhaust flow to the engine coolant via a heat exchanger positioned in an exhaust gas heat recovery line coupled to the EGR cooler responsive to an EGR valve position. In one particular example, a branching pathway of the EGR cooler is positioned downstream of the EGR cooler and allows exhaust gas to be routed to the EGR cooler and/or exhaust gas heat exchanger based on the EGR valve position, which allows for control of the amount of heat transferred to the engine coolant as well as exhaust gas recirculation into the engine. With this arrangement, a cabin temperature of a hybrid vehicle may be increased as quickly as possible under cold start conditions to allow the engine to be quickly turned off after heating the vehicle cabin.

11 Claims, 8 Drawing Sheets

(51) Int. Cl.
*F02D 41/00* (2006.01)
*F01N 5/02* (2006.01)
*F02M 26/28* (2016.01)
*F02M 26/35* (2016.01)
*F02M 26/00* (2016.01)

(52) U.S. Cl.
CPC ............ *F02M 26/28* (2016.02); *F02M 26/35* (2016.02); *F01N 2240/36* (2013.01); *F01N 2410/06* (2013.01); *F01P 2037/02* (2013.01); *F02M 2026/001* (2016.02); *Y02T 10/16* (2013.01)

(56) References Cited

U.S. PATENT DOCUMENTS

| | | |
|---|---|---|
| 8,240,294 B2 | 8/2012 | Surnilla et al. |
| 8,733,102 B2 | 5/2014 | Quix et al. |
| 8,938,964 B2 | 1/2015 | Kanou et al. |
| 9,689,295 B1* | 6/2017 | Uhrich .................. F02M 26/33 |
| 9,816,424 B2* | 11/2017 | Kim ........................ F01N 5/02 |
| 2011/0072808 A1 | 3/2011 | Steurer et al. |
| 2012/0192560 A1 | 8/2012 | Ernst et al. |
| 2013/0111898 A1 | 5/2013 | Dale |
| 2013/0197749 A1 | 8/2013 | Martini et al. |
| 2013/0213600 A1 | 8/2013 | Saitoh |
| 2014/0109884 A1 | 4/2014 | Hornback et al. |
| 2014/0116374 A1 | 5/2014 | Brown |
| 2014/0196454 A1 | 7/2014 | Ulrey et al. |
| 2018/0156143 A1* | 6/2018 | Hussain ................. F02D 41/26 |

\* cited by examiner

Prior Art

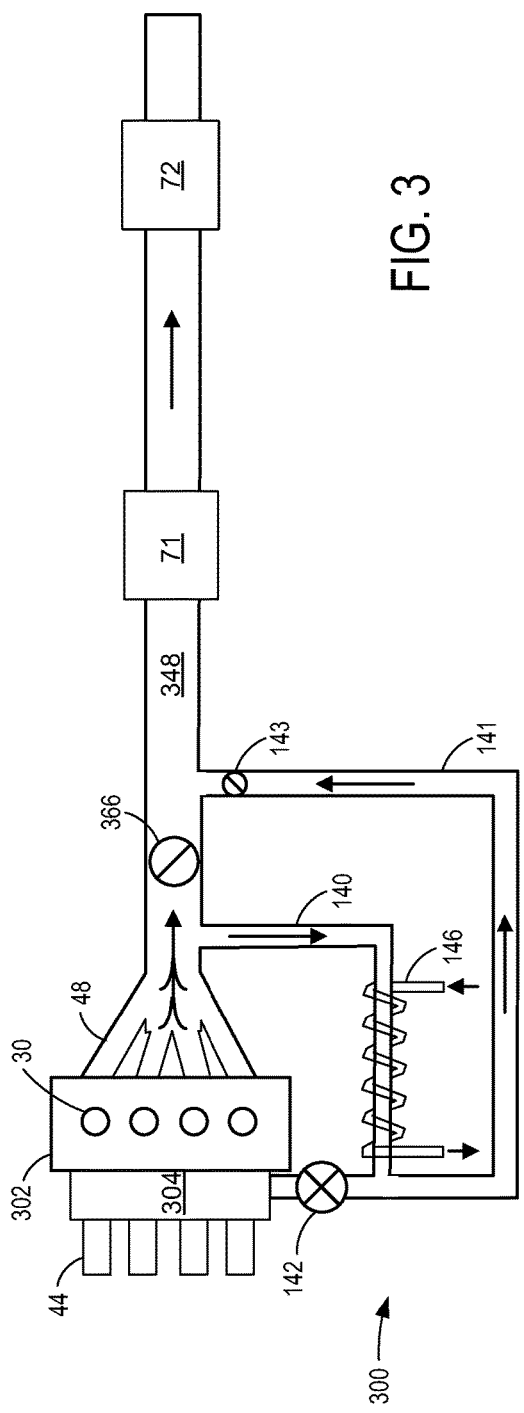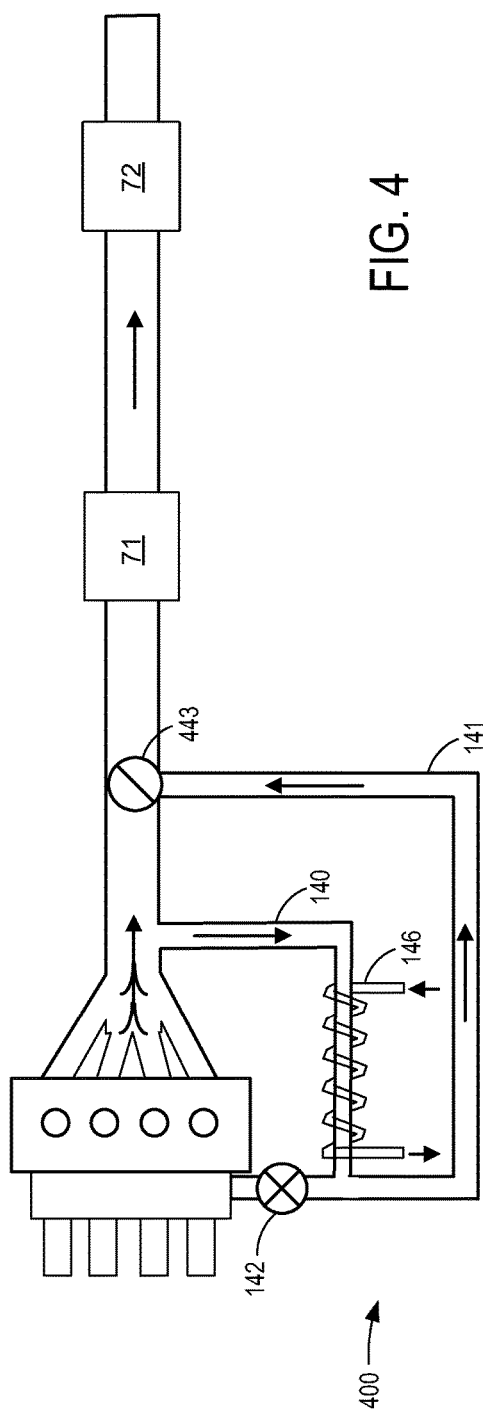

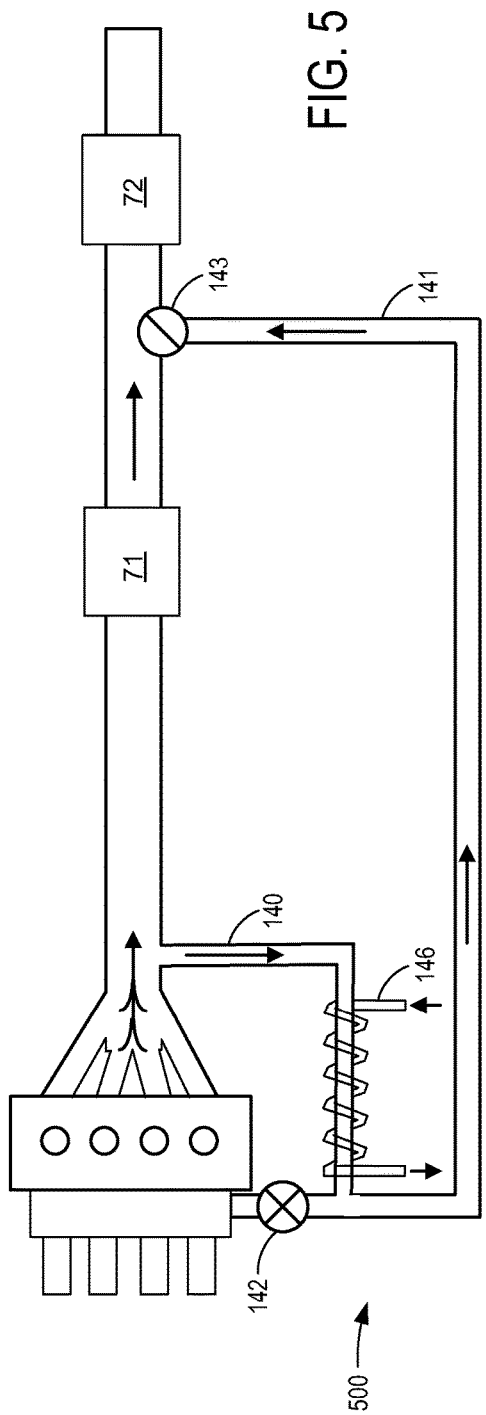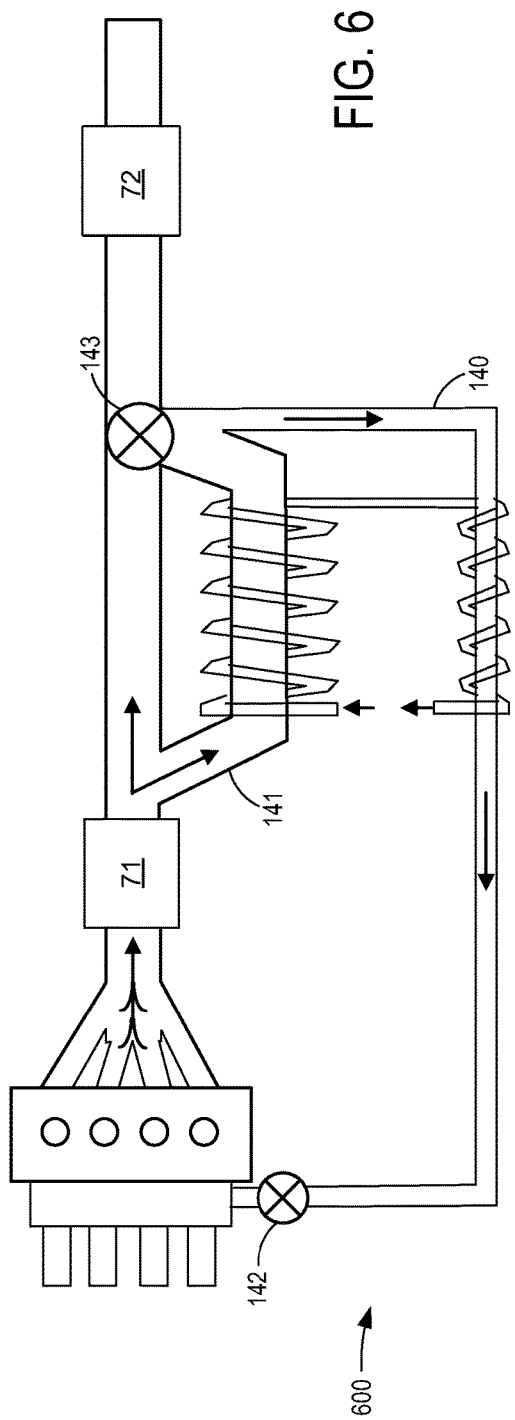

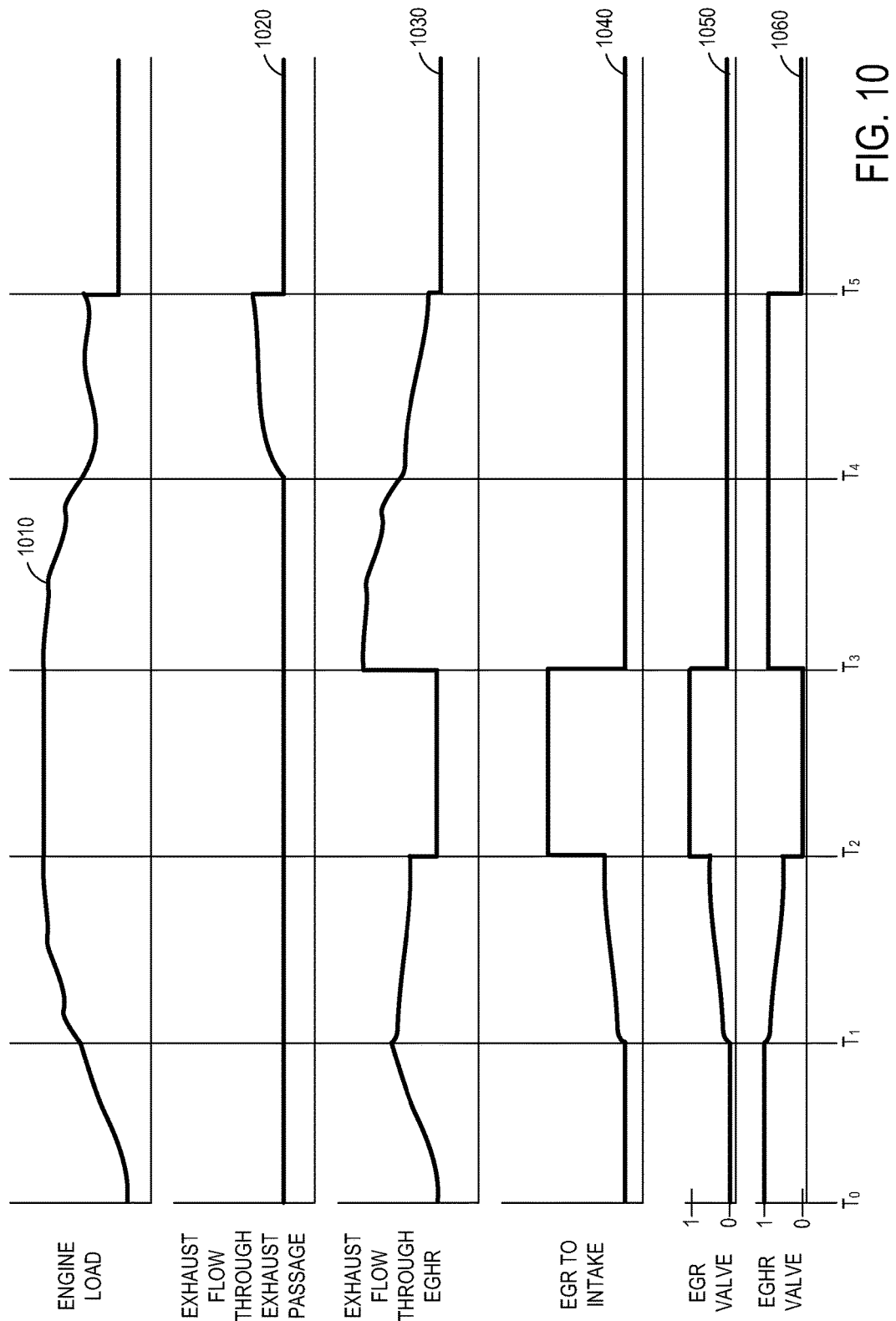

EXHAUST SYSTEM AND METHODS FOR EFFICIENT EXHAUST HEAT RECOVERY

CROSS REFERENCE TO RELATED APPLICATION

The present application is a continuation of U.S. patent application Ser. No. 14/521,413, entitled "EXHAUST SYSTEM AND METHODS FOR EFFICIENT EXHAUST HEAT RECOVERY," filed on Oct. 22, 2014, now U.S. Pat. No. 9,631,540, the entire contents of which are incorporated herein by reference for all purposes.

FIELD

The present description relates to an exhaust system and methods for efficiently recovering exhaust heat during vehicle operation.

BACKGROUND AND SUMMARY

Engine systems use several methods to warm up engine coolant during operation. For example, FIGS. 1A-C illustrate example schematic exhaust systems previously implemented. In one example shown in FIG. 1A, the exhaust system includes a cooled EGR arrangement that is used to transfer exhaust heat to the engine coolant. However, a cooled EGR has the disadvantage that exhaust heat recovery can only occur when exhaust gas is flowing in the EGR, which limits the amount of exhaust heat recovery available from the system. Another disadvantage is that exhaust heat recovery is only a portion of the exhaust gas flow, which may be as low as 25% or lower in some instances relative to the total exhaust flow. Other examples are shown in FIGS. 1B and 1C that include using a separate exhaust heat recovery heat exchanger and valve assembly, possibly in combination with an EGR cooler. However, while the exhaust heat recovered may be increased compared to FIG. 1A (e.g., via a more full exhaust heat recovery and independence relative to the EGR flow), a separate heat exchanger may be large and difficult to package in a vehicle. In addition, heat exchangers may be heavy and/or expensive, which increases the cost of the vehicle. Moreover, packaging an exhaust heat recovery heat exchanger separately from the EGR cooler may further include placing the additional device remotely from the engine, which reduces the temperature of exhaust gas entering the device during warm-up due to heat absorbed by the thermal mass of the upstream components. This arrangement also has the disadvantage that the available heat recovery during engine warm-up is reduced. Yet another example (not shown) includes using a cooled exhaust manifold to extract heat from the exhaust. However, one disadvantage of this arrangement is that the thermal mass of the exhaust manifold is large, which causes a slow coolant warm-up. Another disadvantage is that both the exhaust gas flow and coolant flow through the exhaust manifold cannot be turned off (e.g., because turning off the coolant flow may cause coolant boiling). Thus, transferring heat from the exhaust to the engine coolant may be made to occur during certain unfavorable situations in which it is preferable not to do so, such as at a high temperature and during high load operation.

The inventors have recognized issues with such approaches and herein describe a system and methods for heating engine coolant by transferring heat from an exhaust flow to the engine coolant via a heat exchanger positioned in an exhaust gas heat recovery line coupled to the EGR cooler responsive to an EGR valve position. In particular, an exemplary EGR cooler combined with an exhaust heat recovery device is presented that allows exhaust gas to transfer heat to engine coolant via a branching pathway of the EGR cooler. That is, an exhaust system configured according to the present disclosure allows exhaust gas to be routed to both an EGR and/or the exhaust gas heat exchanger based on EGR valve actuation. The system further allows for differential actuation of exhaust flows to distribute the exhaust gasses to both the EGR and exhaust heat exchanger, which enables a differential control of the exhaust flows therein and thereby control of the heat transferred to the engine coolant during operation. In this way, the technical result is achieved that heat can be recovered from the exhaust gas regardless of flow through the EGR line while also allowing for increased heat recovery from the exhaust gas. One advantage is that up to 100% of the exhaust flow can be allocated to heat recovery based on control of the differential flow through the EGHR branch of the exhaust gas heat recovery device. Another advantage is that the heat recovery can be turned off under operating conditions in which heat recovery may be detrimental, for example, where maximum cooling is desired. With this arrangement, the engine coolant may be efficiently and expeditiously warmed up, e.g., as quickly as possible, during operation. Furthermore, an exhaust system according to the present disclosure allows for a reduced size, weight and cost when implemented into a vehicle.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 3 illustrates an example EGR cooler coupled to an exhaust gas heat recovery line according to a first exemplary configuration with an EGHR outlet connecting to the exhaust passage upstream of a catalyst;

FIG. 4 illustrates a second exemplary configuration with a reduced valve configuration;

FIG. 5 illustrates a third exemplary configuration with an EGHR outlet line connecting to the exhaust passage downstream of the catalyst;

FIG. 6 illustrates a fourth exemplary configuration where the inlet of the EGR cooler couples to the EGHR at a downstream position of the EGHR line;

FIG. 10 shows an example vehicle operating sequence at engine cold start to illustrate the methods according to the present disclosure.

DETAILED DESCRIPTION

Figure 2:
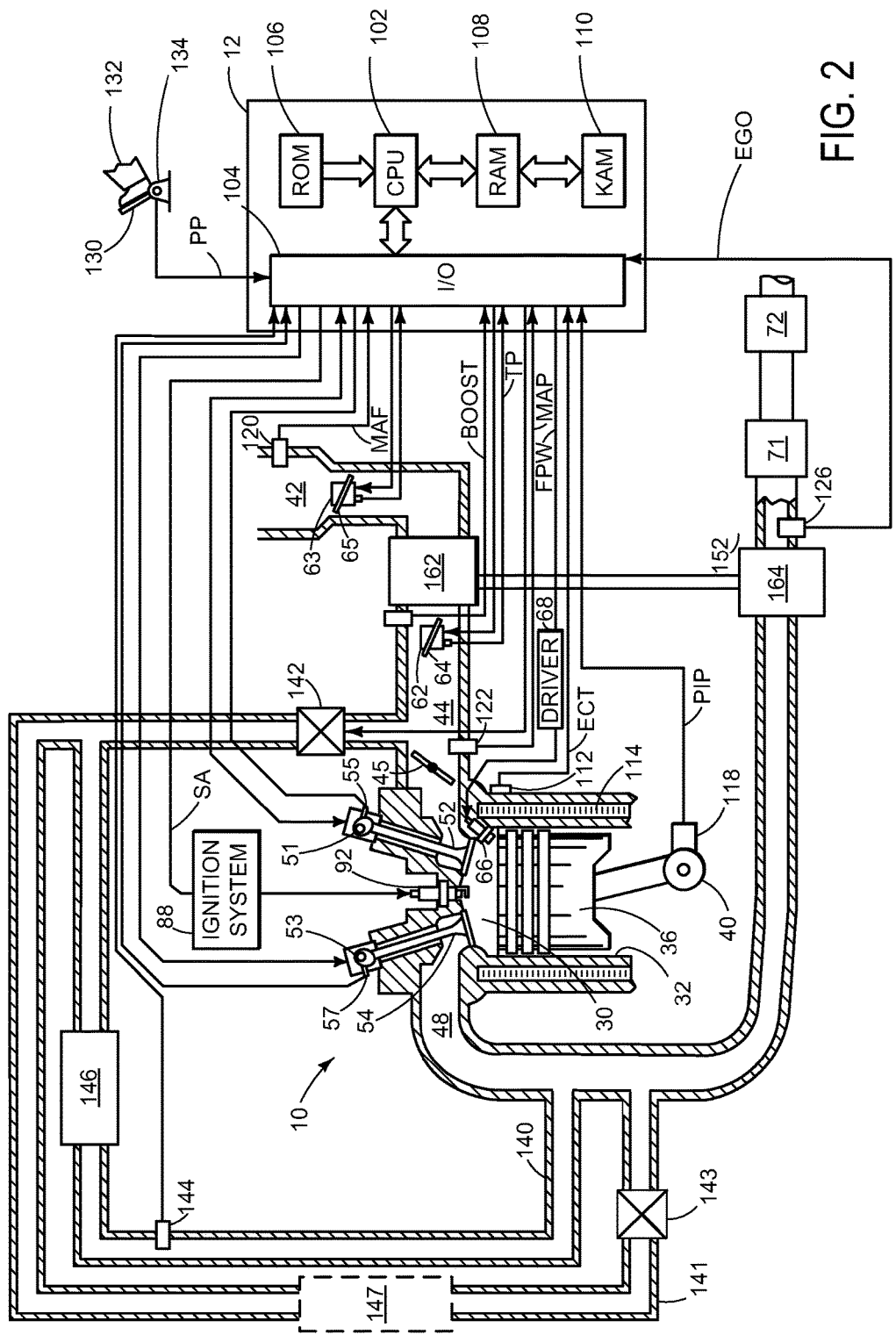
FIG. 2 shows an example hybrid vehicle system according to the present disclosure.
Figure 7:
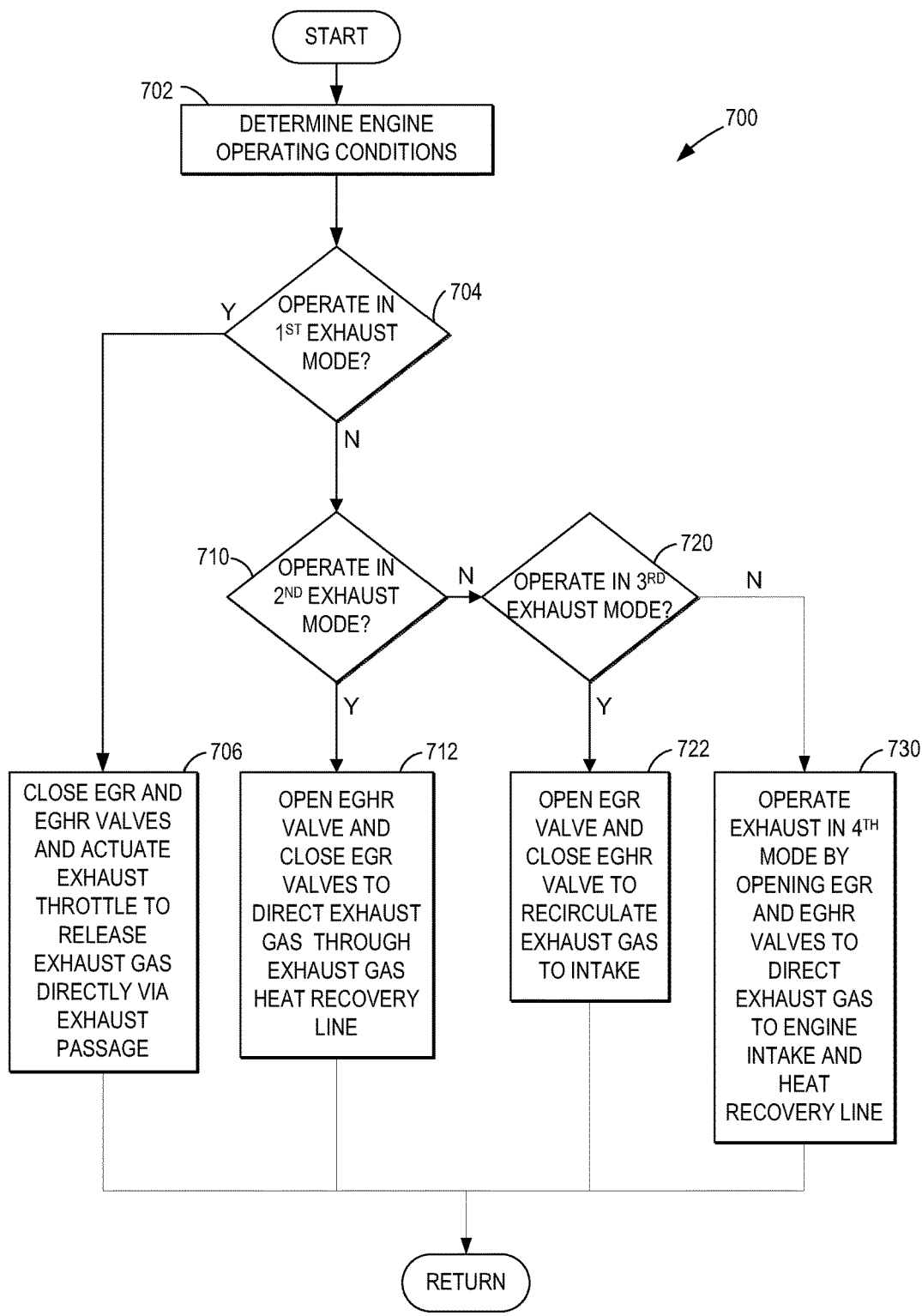
FIGS. 7 and 8 are example flow charts for switching operational exhaust modes by adjusting the exhaust flow pathway.
Figure 8:
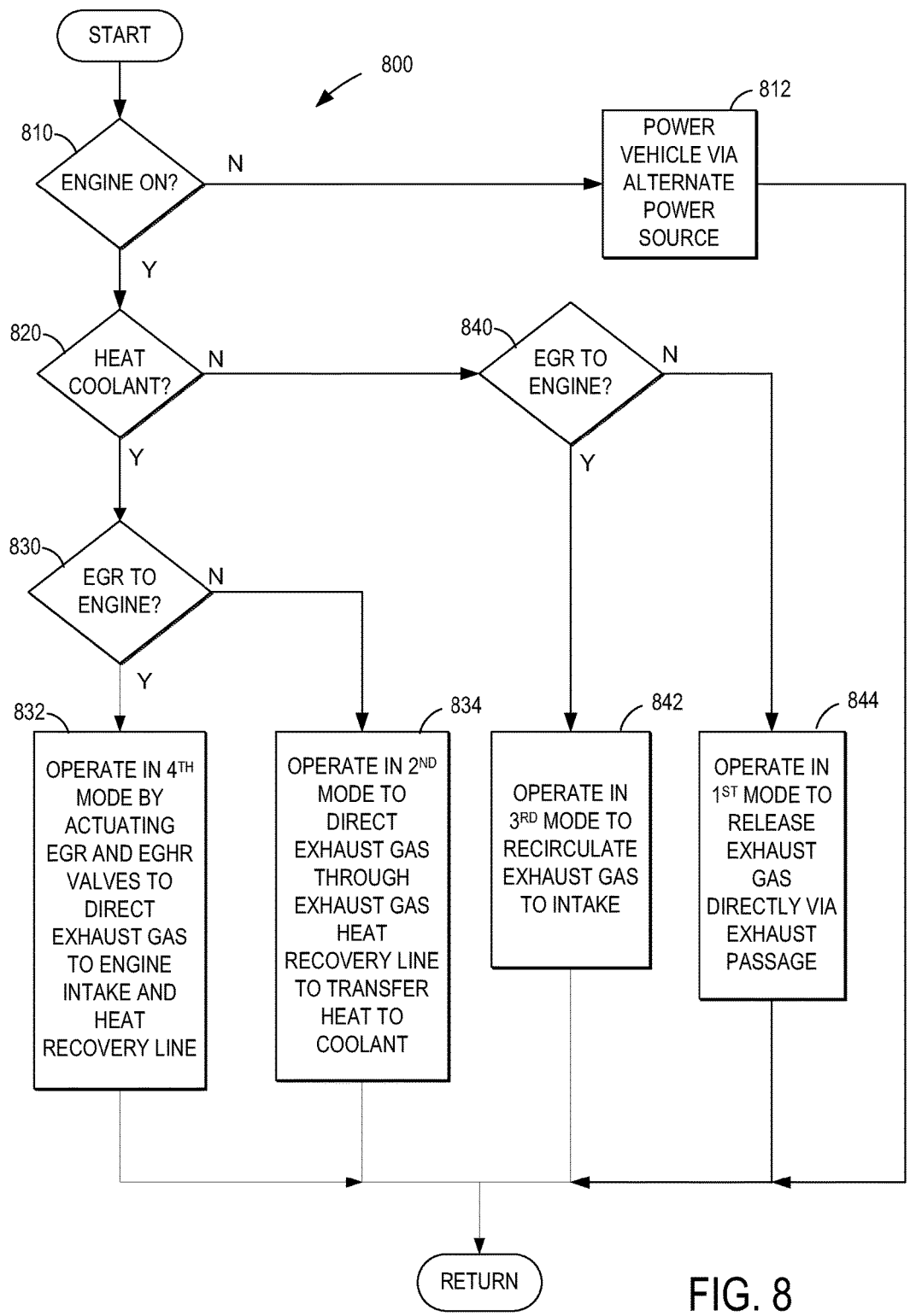
Figure 9:
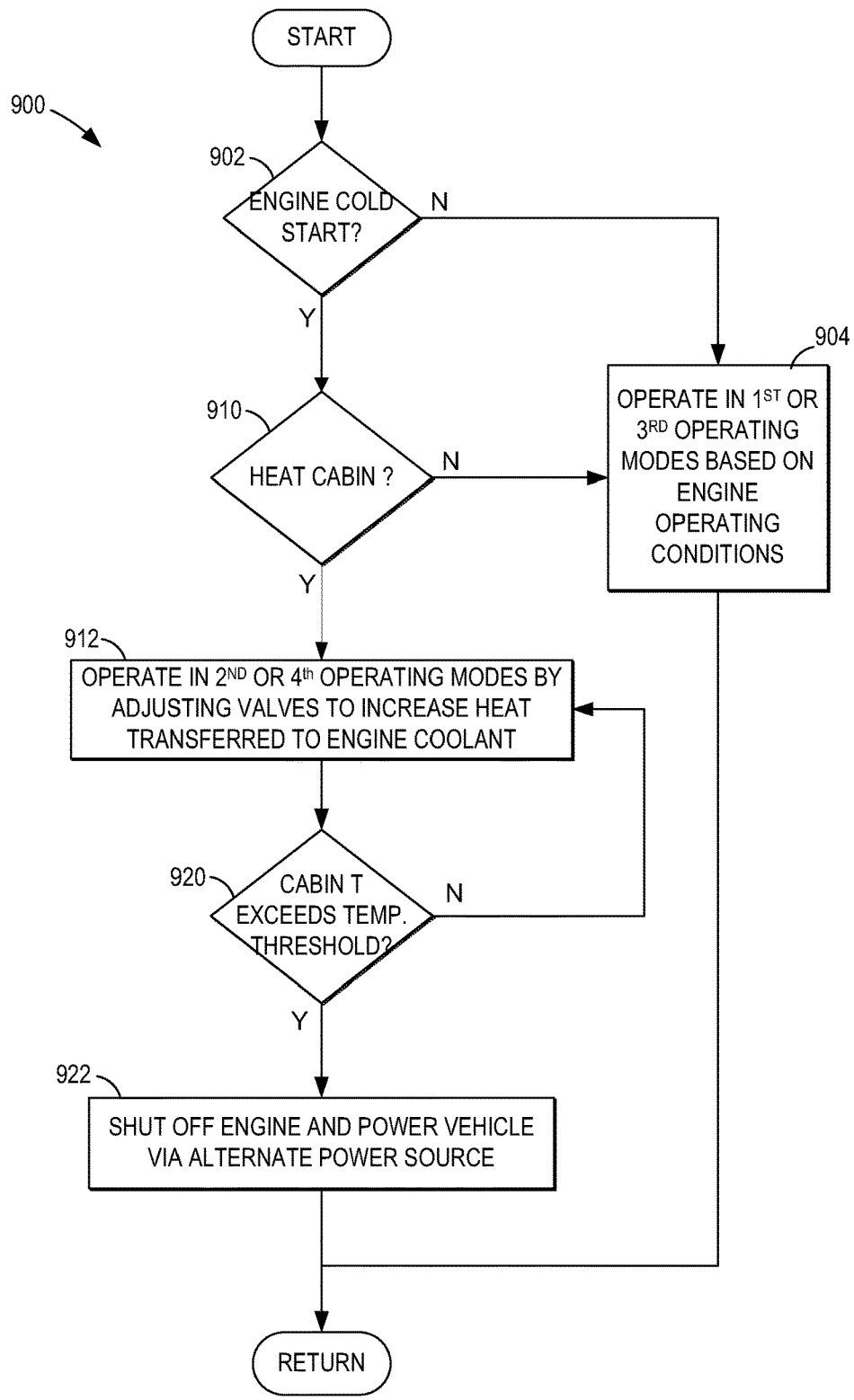
FIG. 9 is an example flow chart for rapidly heating the cabin air temperature by controlling exhaust flow to the EGHR line according to the present disclosure.

Upon starting a car in cold conditions, passengers may desire expedient cabin warming for a comfortable driving experience. Because cabin air is heated by engine coolant routed to the heater core, heat generated by an engine may be the primary source of heat for the passenger compartment in some instances. Thus, to reach a threshold cabin temperature above which it is possible to turn off the engine during vehicle operation, for example, to reduce fuel consumption in a hybrid vehicle, the engine may be operated until sufficient heat has been transferred to the engine coolant. For this reason, FIG. 2 shows an example hybrid vehicle system. Then, FIGS. 3-6 illustrate exemplary exhaust systems with an EGR cooler coupled to an exhaust gas heat recovery line configured and operated according to the present disclosure. FIGS. 7 and 8 further show example methods for changing the operating mode of the vehicle by adjusting an exhaust flow pathway based on valve states whereas FIG. 9 illustrates the method using an exemplary operating sequence that rapidly heats the cabin air temperature by controlling exhaust flow to the EGHR line. FIG. 10 shows an exemplary operating sequence at cold start to illustrate valve adjustments and exhaust flows in greater detail.

Referring now to FIG. 2, a schematic diagram of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (e.g., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake passage 44 via intake passage 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark. In some embodiments, the ignition system may include a dual spark system which includes two spark plugs per cylinder (not shown).

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Intake passage 42 may include a mass air flow sensor 120 and a manifold air pressure sensor 122 for providing respective signals MAF and MAP to controller 12. Further, intake passage 44 may include charge motion control valve 45 for controlling the intensity of charge motion occurring in combustion chamber 30.

Figure 1A:
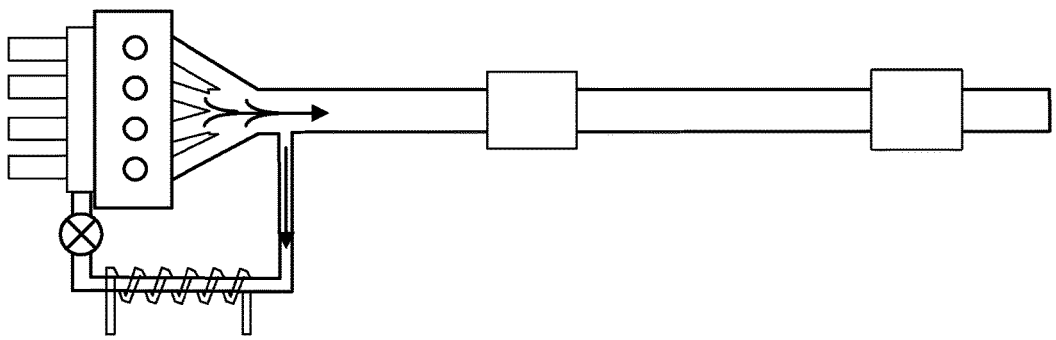
FIGS. 1A-C illustrate example exhaust systems previously implemented.
Figure 1B:
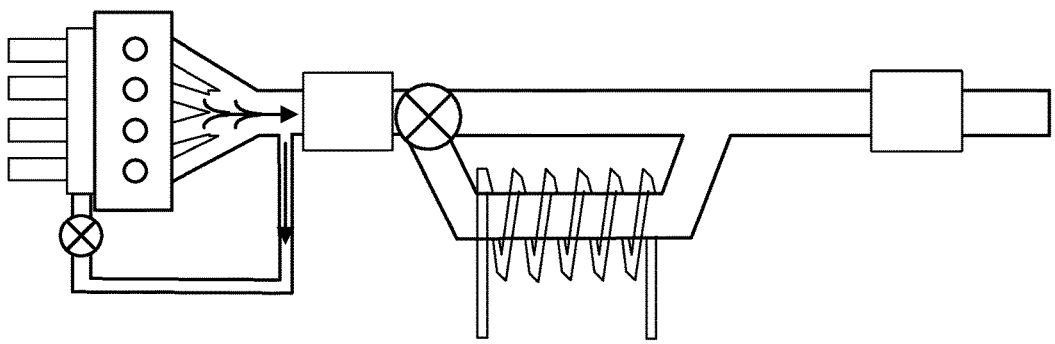
Figure 1C:
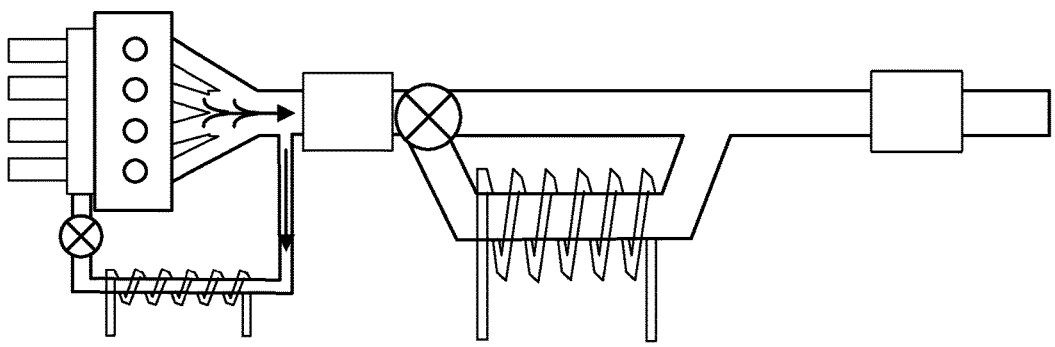

Further, in the disclosed embodiments, an exhaust gas recirculation (EGR) system may route a desired portion of exhaust gas from exhaust passage 48 to intake passage 44 via high-pressure EGR (HP-EGR) passage 140. Although the system is described using HP-EGR, in some examples, a low-pressure EGR (LP-EGR) passage may also or alternatively be included. In implementations where the engine is not turbocharged, a naturally-aspirated EGR may also be employed. The amount of EGR provided to intake passage 44 may be varied by controller 12 via HP-EGR valve 142. In some embodiments, a throttle may be included in the exhaust to assist in driving the EGR. Further, an EGR sensor 144 may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high-pressure EGR system where EGR is routed from upstream of a turbine of a turbocharger to downstream of a compressor of a turbocharger. Further, as shown in FIG. 1, the HP-EGR system may include HP-EGR cooler 146 to transfer heat from the EGR gasses to engine coolant, for example.

According to the present description, HP-EGR 140 is combined with exhaust gas recovery line 141 (EGHR). Thus, for simplicity, an exhaust system configured according to the present disclosure may include a branched path that allows heat from exhaust gasses to be transferred to the coolant without recirculation of the exhaust gasses back to an engine intake. As one example, an EGHR line may be added to the exhaust system with a parallel arrangement to the main exhaust flow, which allows for a compact packing in the engine compartment. Moreover, another branch running from the exhaust pipe to the intake manifold may include an air-to-liquid heat exchanger in order to transfer heat from the exhaust flow to the engine coolant. Valves then allow the system to perform multiple functions in the manner described below. The amount of EGHR provided may be varied by controller 12 via EGHR valve 143.

Engine 10 may further include a compression device such as a turbocharger or supercharger including at least a compressor 162 arranged along intake passage 44 in some embodiments. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream of emission control system 71 and downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor.

Emission control device 71 is shown arranged along exhaust passage 48 downstream of exhaust gas sensor 126. Emission control devices 71 may be a selective catalytic reduction (SCR) system, three way catalyst (TWC), $NO_x$ trap, various other emission control devices, or combinations thereof. For example, device 71 may be a TWC and device 72 may be a particulate filter (PF). Further, in some embodiments, during operation of engine 10, emission control device 71 may be periodically reset by operating at least one cylinder of the engine within a particular air/fuel ratio. In some embodiments, one or the other of devices 71 and 72 may be present in engine 10.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other anticipated variants not specifically listed.

As described above, FIG. 2 shows only one cylinder of a multi-cylinder engine, and each cylinder may similarly include its own set of intake/exhaust valves, fuel injector, spark plug, etc.

Turning to a description of the exhaust system configured with combined EGR and EGHR devices, FIGS. 3-6 show example systems according to the present disclosure.

As one example, the exhaust system of a vehicle may comprise an EGR cooler, an exhaust gas heat recovery line coupled to the EGR cooler, an EGR valve downstream of the EGR cooler for controlling exhaust flow to an engine intake, and a valve located within the exhaust heat recovery line for controlling a rate of exhaust flow therethrough, the rate of exhaust flow determining an amount of heat transferred to an engine coolant. In some example embodiments, the system includes the exhaust gas heat recovery line coupled to the EGR cooler via a branch downstream of the EGR cooler, the exhaust gas heat recovery line further connecting to an exhaust passage, wherein the connection to the exhaust passage is upstream of an exhaust catalyst. However, the connection to the exhaust passage may also be positioned downstream of an exhaust catalyst as described in greater detail below. To increase an exhaust flow through the EGR and/or EGHR device, the exhaust system may further comprise an exhaust throttle positioned in the exhaust passage upstream of the connection between the exhaust gas heat recovery line and exhaust passage upstream of the catalyst. In other embodiments, the valve located in the exhaust heat recovery line may be a passive one-way valve that is opened responsive to an exhaust flow above a threshold. In still other embodiments, an inlet valve may be positioned in the EGR cooler upstream of the EGR cooler. In still further embodiments, the exhaust gas heat recovery line may be coupled to the EGR cooler in an alternate arrangement. For example, the exhaust gas heat recovery line may be coupled to the EGR cooler on an upstream side rather than on the downstream side. Thus, the valves located within the exhaust gas heat recovery line may be positioned upstream of the EGR cooler. To reduce the size within the engine compartment, and to further enhance system packaging, the exhaust system may be configured with the exhaust gas heat recovery line positioned near an exhaust manifold parallel to the exhaust passage.

FIG. 3 illustrates first exemplary configuration 300 wherein example EGR cooler 140 is coupled to EGHR line 141, and wherein the EGHR outlet connects to the exhaust passage upstream of a catalyst, e.g., device 71. For simplicity, engine 10 is shown schematically as a four cylinder engine having an inline arrangement. However, other engine arrangements may alternatively be used. For example, the above technology can be applied to V-6, I-4, I-6, V-12, opposed 4, and other engine types. Intake air from intake passages 44 (e.g., one intake passage is labeled) is directed to intake manifold 304 and further into cylinders 30 where combustion occurs. After combustion, exhaust gasses are directed to exhaust passages 48 (e.g., one exhaust passage is labeled) where individual exhaust flows from each cylinder are shown being combined into exhaust pipe 348, for example. Thereafter, exhaust gasses may be directed along the various pathways according to the methods described. In FIG. 3, exhaust passage 348 includes exhaust throttle 366, in addition to EGR valve 142 and EGHR valve 143 that are used to adjust one or more exhaust flow paths during operation.

Valve actuation allows for exhaust gasses to be redirected through the various passages shown. In some instances, all, none, or a portion of the exhaust gasses may be redirected based on the engine conditions identified. In other words, the exhaust flow may be distributed through each of the pathways independently, or as a combination of two or more of the pathways thereof. For example, under a first set of some conditions, the vehicle may be operated in a first operating mode to release exhaust gases directly via exhaust manifold 348. In this way, the hybrid vehicle is described based on different operating modes that redirect exhaust flows throughout the exhaust system before exiting the vehicle via an exhaust pipe. As another example, under a second set of conditions, the vehicle may be operated in a second operating mode to transfer heat to the engine coolant by directing exhaust gases to EGHR 141. Likewise, under a third set of conditions different from the others, the vehicle may be operated in a third operating mode to recirculate exhaust gasses to engine 10 by directing the exhaust flow to intake manifold 304. For simplicity, during these operating modes (e.g., first through third modes), the description presented adjusts substantially all of the exhaust flow along the indicated pathways. However, under yet a different set of conditions referred to as a fourth set of conditions, the vehicle may be operated in a fourth operating mode to distribute the exhaust gasses through two or more of the pathways (e.g., 50% of the flow to direct exhaust and 50% of the flow to EGHR) based on the engine operating conditions. The methods are described with respect to adjustments made to heat a vehicle cabin after an engine cold start. However, this is non-limiting and other example situations and operating scenarios are possible. For instance, the engine coolant may also be heated to increase the operating efficiency of the engine by lowering the oil viscosity.

As noted above already, when starting a hybrid vehicle in cold conditions, it is desirable to warm up the engine coolant as quickly as possible to allow the engine of the hybrid vehicle to be turned off to reduce fuel consumption during operation. Heating of the engine coolant allows for warming of the cabin since heated engine coolant is routed to the heater core to heat the cabin air. Heat generated by the engine represents a major source of heat for warming the vehicle passenger compartment. For this reason, the engine may continue to operate until a satisfactorily high coolant temperature is attained based on a desired cabin temperature indicated by the vehicle operator.

When EGR valve 142 is at least partially open, a cooled EGR function is enabled. EGHR valve 143 thus acts to prevent uncooled exhaust gas from the exhaust passage from entering the intake manifold. When EGR valve 142 is open and exhaust throttle 366 is closed partially, the EGR function is enhanced by raising the pressure at the EGR branch inlet, which increases a flow of exhaust gas recirculation into the intake manifold. When EGR valve 142 is closed and EGHR valve 143 is at least partially opened, an EGHR function is enabled. Closing exhaust throttle 366 may be used to control the pressure difference between the inlet and outlet branches of the combined EGR/EGHR system. A pressure differential across exhaust throttle 366 causes exhaust gas to flow through EGR passage 140 and EGHR line 141 where heat is transferred to the engine coolant via the heat exchanger. When EGHR valve 143 is an active valve, the rate of flow through EGHR line 141 may be adjusted via the EGHR valve. However, when EGHR valve 143 is a passive valve, the rate of exhaust flow may be adjusted based on one or more of exhaust throttle 366 and EGR valve 142. When EGR valve 142 is at least partially open and EGHR valve 143 is at least partially open, both exhaust gas heat recovery and cooled EGR functions are enabled. The degree of opening of each valve may be used to control the flow and thereby distribution of gasses into each of intake manifold 304 and the exhaust gas heat recovery line EGHR 141. When exhaust flows are simultaneously distributed through both lines, exhaust throttle 366 may be actuated to control the rate of flow through both lines. As noted above, increasing the degree of closing of exhaust throttle 366 may increase the pressure differential between the inlet and outlet branches of the EGR/EGHR system, which increases the rate of flow of the gasses through the combined EGR/EGHR lines.

Various example embodiments of the present disclosure may be configured to provide similar functions but with different or reduced plumbing and/or valve arrangements. For example, in one arrangement EGHR valve 143 may be a passive one-way valve (e.g., a check valve). With this configuration, pressure from exhaust throttle 366 forces the check valve open at a predetermined threshold. Thus, when exhaust gas heat recovery is utilized, exhaust throttle 366 may be actuated to a partially or fully closed position, which creates a force that causes the passive one-way valve, e.g., EGHR valve 143, open. Conversely, when cooled EGR is to be utilized, either alone or in combination with exhaust gas heat recovery, the check valve may prevent uncooled exhaust gas from being recirculated back into the intake manifold via EGHR line 141.

FIG. 4 illustrates a second exemplary configuration 400 with a reduced valve configuration. In FIG. 4, EGHR valve 443 is a combination of an exhaust throttle valve and an outlet valve. For example, EGHR valve 443 may take the form of either a flapper door or a butterfly valve in some implementations. Thus, when EGHR valve 443 is closed, uncooled exhaust gas is prevented from being recirculated into the intake manifold via EGHR line 141. However, when EGHR valve 443 is opened, the exhaust flow may be simultaneously throttled in exhaust manifold 348 (e.g., the main exhaust pipe) and also allowed to flow through the EGHR device to the outlet of the exhaust branch. In this way, opening EGHR valve 443 provides a pressure drop that induces exhaust flow through the heat exchanger while also permitting exhaust gas to be released directly via the exhaust pipe. In some embodiments, an upstream inlet valve may be included in EGR passage 140 upstream of HP-EGR cooler 146 to further control exhaust flow through the EGR cooler.

FIG. 5 illustrates a third exemplary configuration 500 with an EGHR outlet line connecting to the exhaust passage downstream of the first catalyst (e.g., device 71). As shown, the outlet of the branch is relocated to a position downstream of the catalyst. When EGHR valve 143 is opened, a pressure drop across the catalyst develops that induces exhaust flow through EGHR line 141. When configured with this arrangement, actuation of the volume of exhaust flow through the branch of EGHR line 141 may also account for the catalytic activity of the catalyst to allow the vehicle to sufficiently catalyze the exhaust gasses before release to the atmosphere, in addition to heating the engine coolant via the exhaust heat transferred to the engine coolant via a heat exchanger.

FIG. 6 illustrates a fourth exemplary configuration 600 where the inlet of the EGR cooler couples to the EGHR at a downstream position of the EGHR line. With this arrangement, EGHR valve 143 positioned downstream of EGHR line 141 may simultaneously throttle the exhaust flow while also actuating the rate of flow through the exhaust gas recovery line. When EGHR valve 143 is open and EGR valve 142 is closed, heat from the exhaust may be transferred to the engine coolant. Alternatively, when EGR valve 142 is open, exhaust flow through EGR line 140 may occur in the direction indicated by the arrows. In the same manner described above, exhaust may be made to flow throughout the various pathways indicated by the flow arrows by adjusting valves within the exhaust system. Therefore, although the arrangement is different, the combined EGR and EGHR exhaust system may also allow for the heat from the exhaust gasses to be transferred to the coolant under various conditions, e.g., cold conditions. As shown, the heat exchanger, e.g., HP-EGR cooler 146 may alternatively be configured in some instances to simultaneously extract heat from both EGR passage 140 and EGHR line 141.

Turning now to a description of the methods, FIGS. 7 and 8 show example flow charts for switching operational exhaust modes by adjusting the exhaust flow pathway according to the present disclosure.

FIG. 7 shows example flow chart 700 for switching operating modes of the exhaust system by adjusting an exhaust flow pathway via one or more valve adjustments. As noted above, the operating modes are described with respect to exhaust flows through each pathway (e.g., through the exhaust passage, EGR line or EGHR line), and via a combination of the various pathways (e.g., via two or more of the lines) for simplicity. Operational adjustments indicated in FIG. 7 are described with respect to the first example configuration 300 of FIG. 3.

At 702, method 700 includes determining the engine operating conditions. For example, an engine temperature and/or coolant temperature may be determined to identify whether heat is to be transferred to the coolant during engine operation. The example provided herein is an engine cold start wherein exhaust heat is transferred to the coolant from the engine exhaust. The advantage of the disclosed exhaust system and operating methods is that the rate of coolant heating (e.g., and thereby the rate of the vehicle cabin heating) can be controlled based on the amount of heat transferred to the coolant during operation since a substantial amount of heat may be released from the engine of the vehicle through the exhaust pipe. Redirecting the exhaust flow to the exhaust gas recirculation line coupled to the exhaust gas heat recovery line advantageously allows for at least a portion of heat from the engine to be transferred to the engine coolant during operation. In particular, the methods described allow for the heat to be recovered from the exhaust regardless of the on/off state of the EGR. In other words, the exhaust gas heat recovery is not limited to the EGR flow since up to 100% of the exhaust flow can be routed to the heat exchanger or exhaust gas heat recovery line for heat recovery (e.g., by closing EGR valve 142 and exhaust throttle 366, and opening EGHR valve 143).

Based on the engine operating conditions, at 704, method 700 may determine whether the vehicle is to be operated in the $1^{st}$ exhaust mode. If the $1^{st}$ exhaust mode is indicated based on, e.g., a first set of conditions, then one or more valve adjustments may be made to release exhaust gasses directly via the exhaust manifold or passage, as indicated at box 706. For example, EGR valve 142 and EGHR valve 143 may be closed (e.g., actuated to a closed position), which causes exhausted gasses to be released directly via the exhaust pipe (or exhaust passage).

Alternatively, if the controller (e.g., controller 12), determines that the conditions are such that the vehicle is to be operated in another operating mode, method 700 proceeds to box 710 where a decision is made with regard to vehicle operation via the $2^{nd}$ exhaust mode to direct exhaust gas through the exhaust gas heat recovery line while transferring heat to the coolant. If the vehicle is to be operated in the $2^{nd}$ exhaust mode, for example, because a second set of conditions are identified that are different from the first set of conditions, one or more valve adjustments may be made to direct exhaust gasses through EGHR line 141 to transfer heat to the coolant, as indicated at box 712. As one example, EGR valve 142 and exhaust throttle 366 may be closed while EGHR valve 143 is opened to adjust the exhaust airflow pathway through EGHR line 141.

If the exhaust is not to be operated in the $2^{nd}$ exhaust mode at box 710, method 700 proceeds to box 720 where a decision is made with regards to exhaust gas recirculation. If the vehicle is to be operated in the $3^{rd}$ exhaust mode, for example, because a third set of conditions are identified that are different from either the first or second sets of conditions, one or more valve adjustments may be made to direct at least a portion of the exhaust gasses through the EGR line and back into the engine intake, for example, to reduce emissions by recirculating the exhaust flow back into the engine, as indicated at box 722. As one example, EGR valve 142 may be open and exhaust throttle 366 actuated based on engine operating conditions while EGHR valve 143 is closed. These valve adjustments allow the exhaust flow path to be directed through EGR line 140 and toward the engine intake, e.g., intake manifold 304. In some instances, a higher or increased EGR flow may be achieved by throttling the exhaust valve. For example, the exhaust valve may be throttled while the intake vacuum is reduced to increase a rate of exhaust flow through the EGR cooler.

The fourth exhaust mode indicated by box 720 refers to a distributed flow of exhaust through both the EGR and EGHR lines, in addition to the exhaust passage. In other words, the exhausted gasses are directed through the exhaust pathways indicated based on engine operating conditions and a desired coolant heating rate. In this way, one or more of the valves may be adjusted or actuated to a position that distributes the exhaust flow throughout the various lines based on the conditions identified.

Although the exhaust flows have been described simply based on valve on/off states in the $1^{st}$ $2^{nd}$ and $3^{rd}$ operating modes, in an exhaust system on-board a vehicle, exhaust gasses may be distributed throughout a combination of pathways under substantially all conditions. Therefore, the various exhaust modes indicated may also be implemented and managed based on coolant heating and exhaust flow conditions anticipated during the engine drive cycle. For example, under hot conditions (e.g., engine temperature exceeding a temperature threshold) engine heat may be released from the vehicle through the exhaust pipe rather than transferring the heat to the engine coolant via a heat exchanger, e.g., a radiator. Alternatively, under cold conditions, engine heat may be transferred to the coolant for use on-board the vehicle while a portion of the exhaust gas is released via the exhaust passage.

The methods may be implemented within a device comprising an EGR cooler coupled to an exhaust gas heat recovery line. As described, the methods may comprise actuating an EGR valve downstream of the EGR cooler to adjust a flow of exhaust gas to an engine intake and a flow of exhaust gas to the exhaust gas heat recovery line, and controlling an amount of heat transferred from the flow of exhaust gas distributed to the exhaust gas heat recovery line to an engine coolant via a heat exchanger. According to the description, control of the heat transfer may comprise opening the EGR valve to increase the flow of exhaust gas to the engine intake while simultaneously decreasing the flow of exhaust gas to the exhaust gas heat recovery line, wherein closing the EGR valve increases the flow of exhaust gas to the exhaust gas heat recovery line while simultaneously decreasing the flow of exhaust gas to the engine intake. However, inclusion of an exhaust throttle may further control a flow of exhaust gas to the EGR cooler by actuation of the exhaust throttle.

As one example, FIG. 8 illustrates method 800 for switching operating modes of the exhaust system by adjusting the exhaust flow pathway based on the engine operating conditions. At 810, the controller (e.g., controller 12) determines the on/off state of the engine. If the engine is on and running, method 800 proceeds to decision block 820 where controller 12 further determines whether the coolant is to be heated, for instance, because the coolant temperature falls below a temperature threshold. Alternatively, if the engine is off while the vehicle is operated, controller 12 may be configured to provide power to the vehicle via an alternate power source such as an electric motor.

At 820, the controller further determines whether the coolant is to be heated and whether at least a portion of the exhaust gas is to be routed back to the engine as indicated at boxes 830 and 840, which produces the four operating modes identified above.

For example, if coolant heating is to occur (e.g., yes at decision box 820) and controller 12 determines that no exhaust gas is to be directed to the engine (e.g., no at decision box 830), valve adjustments may be made to operate the exhaust in the second exhaust mode by directing exhaust gas through the exhaust gas heat recovery line to transfer heat to the coolant as indicated at box 834. In some instances, the second exhaust mode may include releasing the exhaust gas via both the exhaust gas heat recovery line as well as directly via the exhaust passage while transferring heat to the coolant. However, in other instances, up to 100% of the exhaust gas may be directed through the exhaust gas heat recovery line to increase the heat transferred to the coolant during operation. Moreover, if coolant heating is to occur (e.g., yes at decision box 820) and controller 12 determines that at least a portion of the exhaust gas is to be recirculated to the engine based on the engine operating conditions (e.g., yes at decision box 830), valve adjustments may be made in the manner already described to adjust the vehicle operation to the fourth exhaust mode wherein a portion of the exhaust gasses are directed back into the engine intake while the exhaust gasses are also routed through the exhaust heat recovery line and the exhaust passage as indicated at box 832. In this way, the distribution of the exhausted gasses can be adjusted by adjusting a flow of air throughout the various exhaust lines during vehicle operation to control the amount of heat transferred to the coolant, and thereby a rate of coolant heating.

Alternatively, if no coolant heating is to occur (e.g., no at decision box 820) and controller 12 determines that no exhaust gas is to be directed to the engine (e.g., no at decision box 840), valve adjustments may be made to operate the exhaust in the first exhaust mode by releasing the exhaust gasses directly via the exhaust passage as indicated at box 844. However, if no coolant heating is to occur (e.g., no at decision box 820) and controller 12 determines that at least a portion of the exhaust gas is to be directed to the engine based on the engine operating conditions (e.g., yes at decision box 840), valve adjustments may be made to operate the exhaust in the third exhaust mode by recirculating the exhaust gasses back into the engine intake as indicated at box 842. For example, at least a portion of the exhaust gasses may be recirculated to the engine while the remaining exhaust gasses are released directly via the exhaust passage.

FIG. 9 shows example flow chart 900 for rapidly heating the cabin air temperature by controlling exhaust flow to the EGHR line according to the present disclosure. As described herein, the methods may advantageously provide for the efficient and rapid recovery of heat from the engine during operation. For simplicity, the methods are described with respect to warming a vehicle cabin after an engine cold start. However, other examples are possible and fall within the scope of the present disclosure.

In this way, method 900 may be a method for heating engine coolant during engine warm-up, comprising transferring heat from an exhaust flow to the engine coolant via a heat exchanger positioned in an exhaust gas heat recovery line responsive to an EGR valve position. As one example, the EGR valve position may be continuously variable and therefore used to determine a rate of exhaust flow to the exhaust gas heat recovery line, the exhaust flow rate being used to control the amount of heat transferred to the engine coolant based on engine conditions. Thus, when the EGR valve is opened, a rate of EGR flow to the engine may also be increased, the increased flow rate to the engine decreasing the rate of flow to the exhaust gas heat recovery line. However, when an EGHR valve is included and coupled to the exhaust gas heat recovery line to control the flow rate therethrough, the EGR valve and EGHR valves may be adjusted independently or synchronously to control the rate of exhaust flow to the exhaust gas recovery line to control the heat transferred to the coolant. The heat transferred to the coolant is increased to increase the rate of heating in a vehicle cabin. In addition, when a separate EGHR valve is included, the rate of flow to the exhaust gas heat recovery line may occur independently of EGR operation when the EGR valve is closed. An exhaust throttle placed in an exhaust passage may further increase a rate of flow to one or more of the engine and the exhaust gas heat recovery line, as described in greater detail above. Because the method is described with respect to a cold start on-board a hybrid vehicle, the methods may further comprise shutting the engine off responsive to a cabin air temperature in excess of a temperature threshold, the cabin air temperature being increased responsive to the heat transferred to the engine coolant.

At 902, method 900 includes determining whether the vehicle has undergone an engine cold start. For instance, an engine not used for a short period of time may cool to the point where a temperature (e.g., an engine temperature) falls below a threshold. If a cold start is identified, method 900 proceeds to box 910 where a determination is made whether the vehicle cabin is to be heated. However, if the engine conditions are such that an engine cold start is not to be performed, method 900 proceeds to box 904 by making valve adjustments to release heat directly via the exhaust manifold or passage. For example, as described with respect to method 700 of FIG. 7, both EGR and EGHR valves may be closed to operate the exhaust system in the 1$^{st}$ exhaust mode while exhausting engine gasses directly via the exhaust passage.

Returning to box 910, if the vehicle cabin is to be heated, method 900 proceeds to box 912 by transferring heat to the coolant to further heat the vehicle cabin. For example, the EGHR valve may be opened to produce an increased rate of flow to the EGHR. As one example, substantially all (e.g., 100% in the 2$^{nd}$ exhaust mode) of the exhaust flow may be routed through the EGHR line to transfer heat to the engine coolant. However, as another example, a portion of the exhaust flow may be routed through the EGHR line while the rest of the flow is routed through the exhaust pipe and/or the EGR line to the engine. Furthermore, in some instances, the amount of exhaust flow routed through the EGHR line may be based on the amount of heat transferred and thereby the rate of heating desired in the vehicle cabin. In this way, the amount of heat transferred to the coolant may be adjusted to achieve an optimal cabin heating rate, which allows for the ambient air to be warmed quickly. Alternatively, if no cabin heating is desired, for example, because controller 12 determines that the ambient temperature exceeds a temperature set point indicated by a heating unit or a vehicle operator has manually adjusted a heater control command, method 900 proceeds to box 904 and actuates an amount of exhaust gas recirculation based on the engine operating conditions.

Returning to box 912, upon engaging the exhaust gas heat recovery unit, method 900 proceeds to box 920 where a determination is made with regard to the extent of heating. In this way, a temperature threshold may be included that indicates the temperature of the vehicle cabin. Then, if the cabin temperature exceeds the temperature threshold, method 900 may make operational adjustments based on the temperature above the temperature threshold to shut off the engine while providing power to the vehicle via an alternate power source. For example, a hybrid vehicle may also include an electric motor powered by an electric power supply in addition to the engine. Thus, power supplied by the vehicle may be provided by the motor, which results in reduced fuel use and thereby reduced emissions. If the cabin temperature falls below the temperature threshold, the system may continue to actuate the rate of flow through the EGHR line as the rate of heat transfer to the coolant is managed while heating the vehicle cabin. Then, once the cabin has warmed up, at 922 the engine may be shut off and the vehicle powered via the alternate power source residing on-board the vehicle. Method 900 thus further comprises shutting the engine off responsive to one or more of a cabin air temperature in excess of a temperature threshold, the cabin air temperature being adjusted responsive to heat transferred to the engine coolant, and a heater control command. For example, a vehicle operator may manually adjust a heater control command by pushing a knob or button to reduce the amount of heat that warms up the vehicle cabin.

FIG. 10 shows an example cold start operating sequence of a hybrid vehicle to illustrate the methods just described. In FIG. 10, an exemplary engine load 1010 is shown in the top plot along with the various exhaust flow paths indicated (e.g., 1020, 1030, and 1040) for the exemplary reduced valve configuration of FIG. 4. The EGR and EGHR valve positions (e.g., 1050 and 1060, respectively) are also shown. Time is shown along the x-axis and time increases from left to right.

At $T_0$, the vehicle is engaged under cold start conditions. Thereafter, engine load 1010 increases as the vehicle is driven. During the time period from $T_0$ to $T_1$, the exhaust flow is directed through the EGHR line to transfer the engine heat to the engine coolant. As such, the direct exhaust 1020, that is, the exhaust flow released directly through the exhaust pipe, is maintained at a minimal level. In some instances, the minimal level is substantially zero. As shown, EGHR flow 1030 increases in proportion to the engine load as the heat from the exhaust flow is recovered via the heat exchanger, e.g., EGR cooler 146, during operation. EGR flow 1040 may be controlled based on engine operating conditions; however the engine operating conditions may dictate that no EGR flow occurs during an engine cold start. For this reason, the EGR flow is shown constant (e.g., at minimum level) for simplicity. A reduced rate of flow through the EGR line allows for an increased rate of flow through the EGHR line. During operation, EGR and EGHR valve adjustment may occur such that an enhanced heat recovery occurs even though the engine operates under the colder engine operating conditions. In view of the exhaust flows just described, EGR valve 1050 may be adjusted to the closed position whereas EGHR valve 1060 is adjusted to the open position to produce the cooled exhaust flow indicated. According to the reduced valve configuration of FIG. 4, EGHR valve 443 is a combination of an exhaust throttle valve and an outlet valve. Thus, when EGHR valve 443 is open, the exhaust flow is simultaneously throttled in exhaust manifold 348 (e.g., to reduce a flow in the main exhaust pipe) and allowed to flow through the EGHR device to the outlet of the exhaust branch.

From $T_1$ to $T_2$, the load on the engine increases to a point where emissions released from the engine exceed a threshold (not shown). In response to this condition, a portion of the exhaust flow is directed through the EGR line to recirculate the exhaust gasses as well as to the EGHR line to transfer engine heat to engine coolant. No adjustments are made to direct exhaust 1020, which is maintained at the minimal level. EGHR flow 1030 is reduced as some of the exhaust flow is redirected to the EGR during operation. EGR flow 1040 is thus proportionally increased while EGHR flow 1030 is reduced. In some instances, the total flow may still be reflective of engine load 1010. In this way, the exhaust system according to the present disclosure allows for simultaneous optimization of heat transfer to the coolant and reduction of emissions via EGR. Based on the exhaust flows shown, EGR valve 1050 may be adjusted to an open position and further actuated during operation based on a set of desired emissions, which may be measured by a sensor in the exhaust system. EGHR valve 1060 may also be adjusted based on the engine load and actuated responsive to the EGR flow and identified conditions.

From $T_2$ to $T_3$, the engine is operated at a high load and so produces higher levels of emissions. Thus, emissions released from the engine may continue to exceed the threshold (not shown). Engine emissions may depend on engine temperature. Thus, as the vehicle is driven longer, the temperature of the engine may also increase, which changes the efficiency of exhaust emissions during operation. In some embodiments, vehicle emissions may be estimated and/or calculated, e.g., via a model, to determine the vehicle emissions expected for a given set of operating conditions. Although the temperature of the cabin may increase during the operating sequence, controller 12 may monitor the cabin temperature while the temperature falls below the temperature threshold, as described with respect to FIG. 9. In response to the increased engine load, the exhaust flow may be at least partially directed through the EGR line to recirculate exhaust gasses while preventing exhaust flow through the EGHR line. No adjustments are made to direct exhaust 1020, which is maintained at the minimal level. EGHR flow 1030 is reduced to a minimal level as a portion of the exhaust flow is redirected to the EGR during operation to reduce emissions by increasing the rate of exhaust gas recirculation. EGR flow 1040 is thus increased to a maximal level based on the engine operating conditions while EGHR flow 1030 is reduced to a minimal level. As one example, the rate of flow through the EGR line may be increased to a maximal level that is a flow rate of about 25% of the inlet flow rate. In this way, the exhaust system allows for cooled EGR via the exhaust valve adjustment. Based on the exhaust flows shown, EGR valve 1050 may be actuated to the open position whereas EGHR valve 1060 may be adjusted to the closed position.

From $T_3$ to $T_4$, the load on the engine decreases and thus the amount of exhaust emissions generated are reduced. In response, adjustments may be made to direct a portion of the exhaust flow through the EGHR line again to transfer engine heat to engine coolant while the exhaust flow through the EGR is turned off (e.g., because the emissions are reduced and fall below a threshold). No adjustments are made to direct exhaust 1020, which is maintained at the minimal level. EGHR flow 1030 is increased based on the engine load while EGR flow 1040 is reduced. In this way, the exhaust system continues transferring heat to the coolant to warm up the vehicle cabin. Based on the exhaust flows shown, EGR valve 1050 may be actuated to the closed position while EGHR valve 1060 is actuated to the open position and adjusted based on engine load.

From $T_4$ to $T_5$, the load on the engine fluctuates based on the driving conditions. During this period, a portion of the exhaust flow may be released via the exhaust pipe. Thus, valve adjustments are made to the EGHR valve to adjust the exhaust flow while adjusting the rate of heat transferred to the coolant. In response, a portion of the exhaust flow through the EGHR line may be reduced while the exhaust flow through the exhaust pipe is increased. No adjustments are made to EGR flow 1040, which is maintained at the minimal level. The exhaust system continues transferring heat to the coolant to warm up the vehicle cabin but at a lower rate. However, because the rate of heat transfer may depend on the engine temperature in some instances, the exhaust flow through the exhaust passage may be increased while exhaust flow through the exhaust gas heat recovery line is decreased to heat the vehicle cabin. For example, operational adjustments may be made to increase the amount of exhaust flow directed to the catalyst based on engine operating conditions. EGR valve 1050 may thus be maintained in the closed position while EGHR valve 1060 is in the open position.

At $T_5$, the cabin temperature exceeds the temperature threshold, the engine shut off and power provided by an alternate power source such as an electric motor (not shown). In this way, the load on the engine may be shutoff or reduced to a minimal level. Thereafter, the exhaust flows may also be prevented since combustion no longer occurs in the engine. EGR valve 1050 is maintained in the closed position while EGHR valve 1060 is adjusted to the closed position. However, in some instances, the valves may simply be held at their respective positions when engine shut off occurs since engine exhaust is no longer produced. Then, when the engine is reengaged, one or more adjustments may be made to distribute the exhaust flow throughout the exhaust system in the manner already described.

In this way, a reduced mass, highly efficient exhaust gas heat exchanger is presented. In addition, the multi-functional exhaust unit may be operated in different modes to route exhaust gases through different paths during operation. In one particular example, the combined EGR and EGHR exhaust system is used to warm up the engine coolant quickly under cold conditions. For example, it may be desirable to route exhaust gas to the heat exchanger while also avoiding an excess thermal load on the radiator. Furthermore, the system according to the present disclosure allows for a reduced size, weight and cost when implemented into a vehicle as described.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
actuating both a first valve and a second valve to a more open position, the first valve arranged at a junction between an exhaust passage and an exhaust gas heat recovery line upstream of a catalyst, where the first valve is downstream of a junction between the exhaust passage and an exhaust gas recirculation passage, and wherein the second valve is an exhaust gas recirculation valve located between an intake manifold and the exhaust gas recirculation passage; and controlling an amount of heat transferred from a flow of exhaust gas distributed to the exhaust gas heat recovery line to an engine coolant via a heat exchanger.

2. The method of claim 1, wherein the amount of heat transferred increases as the first valve is moved to the more open position.

3. The method of claim 2, wherein the amount of heat transferred increases in response to the exhaust gas recirculation valve moving toward a more closed position.

4. The method of claim 3, wherein the amount of heat transferred decreases in response to the first valve moving to a more closed position and the exhaust gas recirculation valve moving toward a more open position.

5. The method of claim 1, wherein the exhaust gas recirculation passage is fluidly coupled to an engine intake system at a junction downstream of the exhaust gas recirculation valve.

6. The method of claim 1, wherein the first valve is moved to the more open position in response to a cold-start.

7. The method of claim 1, wherein the exhaust gas heat recovery line is fluidly coupled to the exhaust gas recirculation passage downstream of the heat exchanger.

8. A system comprising:
an exhaust passage comprising a first catalyst upstream of a second catalyst;
an exhaust gas recirculation passage coupled to the exhaust passage at a first junction upstream of the first catalyst;
an exhaust gas heat recovery line coupled to the exhaust passage at a second junction between the first and second catalysts; and
a valve arranged at a branching between the exhaust gas heat recovery line and the exhaust passage,
wherein the valve is a first valve, and where a second valve is located between an intake manifold and a third junction between the exhaust gas recirculation passage and the exhaust gas heat recovery line, and
wherein moving the first valve to a more open position and moving the second valve to a more closed position increases exhaust gas flow to the exhaust gas heat recovery line and increases heat transfer to an engine coolant.

9. The system of claim 8, wherein the first valve is configured to completely obstruct the exhaust gas heat recovery line in a fully closed position, and where the first valve partially obstructs the exhaust passage in a fully open position.

10. The system of claim 8, wherein the exhaust gas recirculation passage comprises an exhaust gas recirculation cooler upstream of the third junction.

11. A system comprising:
an exhaust passage comprising a first catalyst upstream of a second catalyst;
an exhaust gas recirculation passage coupled to the exhaust passage at a first junction upstream of the first catalyst;
an exhaust gas heat recovery line coupled to the exhaust passage at a second junction between the first and second catalysts; and
a valve arranged at a branching between the exhaust gas heat recovery line and the exhaust passage,
wherein the valve is a first valve, and where a second valve is located between an intake manifold and a third junction between the exhaust gas recirculation passage and the exhaust gas heat recovery line, and
wherein the exhaust gas recirculation passage comprises an exhaust gas recirculation cooler upstream of the third junction.

* * * * *